United States Patent [19]

Evans et al.

[11] 4,340,387

[45] Jul. 20, 1982

[54] PROCESS FOR THE DYEING OF FIBRE MATERIAL

[75] Inventors: David G. Evans, Bamford, England; Jacques Zurbuchen, Pratteln; Willi Leutenegger, Bottmingen, both of Switzerland

[73] Assignee: Ciba-Geigy Corporation, Ardsley, N.Y.

[21] Appl. No.: 221,468

[22] Filed: Dec. 30, 1980

Related U.S. Application Data

[63] Continuation of Ser. No. 15,385, Feb. 26, 1979, abandoned, which is a continuation of Ser. No. 890,335, Mar. 27, 1978, abandoned, which is a continuation of Ser. No. 638,134, Dec. 5, 1975, abandoned, which is a continuation of Ser. No. 302,695, Nov. 1, 1972, abandoned.

[30] Foreign Application Priority Data

Nov. 9, 1971 [CH] Switzerland .................... 16260/71
Nov. 9, 1971 [CH] Switzerland .................... 16261/71

[51] Int. Cl.$^3$ .......................... D06P 7/00; D06P 5/00
[52] U.S. Cl. ........................................ 8/580; 8/586; 8/636; 8/159
[58] Field of Search .......................... 8/580, 636, 586

[56] References Cited

U.S. PATENT DOCUMENTS

| | | | |
|---|---|---|---|
| 2,460,206 | 1/1949 | Wentz | 8/149.1 |
| 3,478,376 | 11/1969 | Daeuble et al. | 8/178 R |
| 3,716,330 | 2/1973 | Kitamura | 8/176 |
| 3,788,807 | 1/1974 | Beiritz | 8/26 |
| 3,790,342 | 2/1974 | Love | 8/173 |
| 4,260,389 | 4/1981 | Lister | 8/477 |
| 4,270,236 | 6/1981 | Zurbuchen et al. | 8/159 |
| 4,289,496 | 9/1981 | Lister | 8/477 |

FOREIGN PATENT DOCUMENTS

| | | | |
|---|---|---|---|
| 743660 | 1/1956 | United Kingdom | 8/93 |
| 1103146 | 2/1968 | United Kingdom | 8/93 |
| 1212236 | 5/1969 | United Kingdom | 8/169 |
| 1245680 | 9/1971 | United Kingdom | 8/93 |

OTHER PUBLICATIONS

Chemie fasern Textilindustrie, 4/22/72, pp. 298–301.
Fisher–Bobsien, Lexikon Fuer die Gesante Textilveredlung, 1950, p. 189.
Arbuckle, J. Jour. Soc. Dyers & Colorists, Oct. 1968, #10, pp. 497–501.
Amer. Dyestuff Reporter, 8/17/53, pp. 540–553.
Clarke, W. An Introduction to Textile Printing, Butterworth, London, 1964, pp. 4–7.
Kern, Amer. Dyestuff Reporter, 5/15/61, pp. 368–373.
Sandoz, International Dyer & Textile Printer, Jul. 16, 1971, pp. 88–89.
American Dyestuff Reporter, Oct. 1971, p. 66.

*Primary Examiner*—Maria Parrish Tungol
*Attorney, Agent, or Firm*—Edward McC. Roberts

[57] ABSTRACT

An improved process for dyeing of fibre material, especially textile fibres, by applying to the fibre material at a temperature below the absorption temperature of the dyestuffs and with a goods-to-liquor ratio of 1:1.5 to 1:4, a concentrated aqueous dye liquor, said concentrated aqueous dye liquor containing at least one dyestuff which, in the case of the substrate to be dyed, has affinity to the fibres and which is either soluble or dispersible in water, and 0.2 to 10 g/l, preferably 2 to 5 g/l, of a surface-active agent, and finishing of the dyeing by means of a heat treatment, e.g. introduction of saturated steam, superheated steam or hot air, preferably by heating from without, at temperatures of 95° to 140° C.

5 Claims, No Drawings

PROCESS FOR THE DYEING OF FIBRE MATERIAL

This application is a continuation of application Ser. No. 015,385, filed Feb. 26, 1979, now abandoned, which is a continuation of application Ser. No. 890,335, filed Mar. 27, 1978, now abandoned, which is a continuation of application Ser. No. 638,134, filed Dec. 5, 1975, now abandoned, which is a continuation of application Ser. No. 302,695, filed Nov. 1, 1972, now abandoned.

The present invention relates to a process for the dyeing of fibre material in concentrated dye liquors with water-soluble or water-dispersible dyestuffs, as well as to the fibre material dyed by the new process.

Processes are known which consist of the continuous dyeing of voluminous textile webs in concentrated dye liquors by the feeding of the webs through a trough filled with dye liquor, or by the impregnation of the said material by means of an overflow, with dye liquor absorptions of ca. 250 to 300% being obtained; and subsequently the fixing of the dyestuff by, for example, steaming with saturated steam. These processes are limited, however, to the dyeing of voluminous webs, particularly carpets.

Moreover, the process has already been suggested wherein fibre material is dyed in concentrated dye liquors containing the dyestuff and at least one foam-forming compound, dyeing being effected by means of a stable microfoam. For example, the material to be dyed is sprayed with dye liquor and fed into a drum dyeing machine, whereupon an intense foam is produced by a tumbling action, the dyestuff being then fixed by a heat treatment consisting, for example, of the introduction of saturated steam or hot air. But this process too has disadvantages, one particular disadvantage being that relatively large amounts of foam-forming compounds are required, with the removal of these from the dyed material necessitating the application of several washing operations. Furthermore, dyeing in the presence of a stable microfoam can be performed only in a quite specific type of equipment.

A process has now been found which renders possible, in a simple manner and with avoidance of the mentioned difficulties and disadvantages, the obtainment on diverse fibre materials, preferably textile fibres, of excellent dyeings in concentrated aqueous dye liquors. This process comprises the application to the fibre material of an aqueous dye liquor at a temperature below the absorption temperature of the dyestuffs and with a goods to liquor ratio of 1:1.5 to 1:4, the said concentrated aqueous dye liquor containing at least one dyestuff which, in the case of the substrate to be dyed, has affinity to the fibres, and which is either soluble or dispersible in water, and 0.2 to 10 g/l, preferably 2 to 5 g/l, of a surface-active agent; and the finishing of the dyeing by means of a heat treatment.

Suitable water-soluble dyestuffs having affinity to fibres or water-dispersible dyestuffs, applicable according to the invention, are the same organic dyestuffs as are normally used in textile dyeing for the dyeing of fibre materials, particularly textile fibres, from an aqueous dye liquor. Depending on the substrate to be dyed, suitable dyestuffs are water-soluble anionic or cationic dyestuffs, or dispersion dyestuffs.

The dyestuffs usable according to the invention can belong to the most diverse classes of dyestuffs. These are, in particular, mono-, dis- or polyazo dyestuffs, formazan, anthraquinone, nitro, methine, styryl, azastyryl or phthalocyanine dyestuffs.

With regard to the water-soluble anionic dyestuffs these are, in particular, the alkali metal salts or ammonium salts of the dyestuffs known as acid wool dyestuffs, of the reactive dyestuffs, or of the substantive cotton dyestuffs of the azo, anthraquinone and phthalocyanine series. Suitable azo dyestuffs are preferably metal-free mono- and disazo dyestuffs containing one or more sulphonic acid groups, heavy-metal-containing, particularly copper-, chromium-, nickel- or cobalt-containing, monoazo, disazo and formazan dyestuffs, and metallised dyestuffs containing bound to one metal atom 2 molecules of azo dyestuff. Anthraquinone dyestuffs to be given particular mention are 1-amino-4-arylamino-anthraquinone-2-sulphonic acids, and in the case of phthalocyanine dyestuffs, particularly sulphated copper phthalocyanines or phthalocyanincarylamides.

As reactive dyestuffs containing sulpho groups mention may be made of water-soluble dyestuffs of the azo, anthraquinone and phthalocyanine series containing at least one fibre-reactive group, e.g. a monochlorotriazinyl, dichlorotriazinyl, dichloroquinoxalinyl, trichloropyrimidinyl, difluorochloropyrimidinyl, $\alpha$-bromoacrylamide group or the $\beta$-oxyethylsulphuric acid ester group.

In the case of the water-soluble cationic dyestuffs, these are the usual salts and metal halide double salts, e.g. zinc chloride double salts, of the known cationic dyestuffs, especially the methine, azomethine, or azo dyestuffs which contain the indolinium, pyrazolium, imidazolium, triazolium, tetrazolium, oxdiazolium, thiodiazolium, oxazolium, thiazolium, pyridinium, pyrimidinium or pyrazinium ring. Also suitable are cationic dyestuffs of the diphenylmethane, triphenylmethane, oxazine and thiazine series, and, finally, also dye salts of the arylazo and anthraquinone series with an external onium group, e.g. an external cyclammonium group or alkylammonium group.

Concerning the dispersion dyestuffs, these are especially azo dyestuffs, as well as anthraquinone, nitro, methine, styryl, azostyryl, naphthoperinone, quinophthalone or naphthoquinoneimine dyestuffs. These difficulty water-soluble dyestuffs form in the finely-ground condition, with the aid of dispersing agents, very fine aqueous suspensions.

The process according to the invention is suitable also for the optical brightening of undyed textile materials with dispersion brighteners, and particularly with water-soluble anionic and cationic optical brighteners. These can belong to any desired classes of brighteners. They are, in particular, stilbene compounds, coumarins, benzocoumarins, pyrazines, pyrazolines, oxazines, dibenzoxazolyl or dibenzimidazolyl compounds, as well as naphthalic acid imides.

The amounts in which the dyestuffs are used in the dye baths can vary, depending on the desired depth of colour, within wide limits; in general, amounts of 0.001 to 10 percent by weight, relative to the material to be dyed, of one or more dyestuffs have proved advantageous.

The cationic dyestuffs are employed, for example, for the dyeing of fibre materials made from polyacrylonitrile, modified synthetic polyesters or polyamides, cellulose-2½-acetate, cellulose triacetate and silk; the anionic acid dyestuffs, metal-complex dyestuffs, substantive and reactive dyestuffs for the dyeing of fibre materials made from natural or regenerated cellulose, such as cotton, spun rayon and Rayon, natural polyamides such as wool and silk, synthetic polyamides such as polyhexamethylenediaminoadipate, poly-ε-caprolactam or poly-ω-aminoundecanoic acid, and polyurethanes; and the dispersion dyestuffs for the dyeing of fibre materials made from synthetic polyesters such as polyethylene glycol terephthalate, polycyclohexanedimethyleneterephthalate, cellulose triacetate, polyacrylonitrile, synthetic polyamides, polyurethanes and polyolefins.

The process according to the invention has proved particularly satisfactory for the dyeing of mixtures of these fibre types with a mixture of the dyestuffs suitable for the substrates to be dyed; for example, mixtures of polyacrylonitrile/spun rayon, polyester/cotton, polyester/spun rayon, polyamide/spun rayon, polyamide/cotton, cellulose-2½-acetate/spun rayon, cellulose-triacetate/spun rayon, polyacrylonitrile/polyester, and especially polyester/wool.

The fibre materials can be in the most diverse stages of processing; e.g., they may be in the form of fabrics, knitwear, yarns, ready-made articles, knitted goods, fibre fleece materials, textile floor coverings such as woven, tufted or felted carpets.

Commercial surface-active anionic, non-ionic, cationic and ampholytic tensides are suitable as tensides usable according to the invention. The following are mentioned as particularly suitable anionic surface-active agents:

(1) the sodium, potassium, ammonium, N-alkyl, N-hydroxyalkyl, N-alkoxyalkyl or N-cyclohexylammonium salts or hydrazinium and morpholinium salts of fatty acids having 10 to 20 carbon atoms, which are described as soaps, such as lauric, palmitic, stearic, or oleic aid, of naphthenic acids, of resinic acids such as abietic acid, e.g. the so-called colophouium soap;

(2) sulphated primary of secondary purely aliphatic alcohols of which the alkyl chain contains 8 to 18 carbon atoms, e.g. sodium lauryl sulphate, potassium-α-methyl-stearylsulphate, sodium tridecylsulphate, sodium oleylsulphate, potassium stearylsulphate, or the sodium salts of coconut oil alcohol sulphates;

(3) sulphated unsaturated higher fatty acids or fatty acid esters such as oleic acid, elaidic acid or ricinoleic acid, or their lower alkyl esters, e.g. ethyl, propyl or butyl esters, and the oils containing such fatty acids, such as olive oil, castor oil and rape oil;

(4) sulphated ethylene oxide adducts such as sulphated addition products of 1 to 20 moles of ethylene oxide with fatty amines, fatty acids, or aliphatic alcohols having 8 to 20 carbon atoms in the alkyl chain, e.g. with stearylamine, oleylamine, stearic acid, oleic acid, lauryl alcohol, myristyl alcohol, stearyl alcohol or oleyl alcohol; further the addition products of 1 to 5 mols of ethylene oxide with alkyl phenols having at least 7 carbon atoms in the alkyl chain, converted into an acid ester with the aid of an organic dicarboxylic acid such as maleic acid, malonic acid or succinic acid, preferably however with an inorganic polybasic acid such as o-phosphoric acid, or especially sulphuric acid, such as the acid sulphuric acid ester of the addition product of 2 mole of ethylene oxide with 1 mol of o-nonylphenol, the acid sulphuric acid ester of the addition product of 1.5 mols of ethylene ozide with 1 mol of p-tert.octyl phenol, the acid sulphuric acid ester of the addition product of 5 mols of ethylene oxide with 1 mol of p-nonyl phenol, the acid phosphoric acid ester of the addition product of 2 mols of ethylene oxide with 1 mol of p-nonyl phenol, the acid maleic acid ester of the addition product of 2 mols of ethylene oxide with 1 mol of p-nonylphenol;

(5) sulphated esterified polyoxy compounds, e.g. sulphated partially esterified polyvalent alcohols, such as the sodium salt of the sulphated monoglyceride of palmitic acid; instead of sulphates, it is also possible to use esters with other polyvalent mineral acids, e.g. phosphates;

(6) primary and secondary alkylsulphonates of which the alkyl chain contains 8 to 20 carbon atoms, e.g. ammonium-decylsulphonate, sodium-dodecylsulphonate, sodium-hexadecenesulphonate-8, sodium-stearylsulphonate;

(7) alkylarylsulphonates such as alkylbenzenesulphonates with a straight chain or branched alkyl chain having at least 7 carbon atoms, e.g. sodium dodecylbenzenesulphonate, 1,3,5,7-tetramethyl-octylbenzenesulphonate, sodium-octadecylbenzenesulphonate, such as alkyl- and/or aralkyl-naphthalenesulphonates, e.g. sodium-1-iso-propylnaphthalene-2-sulphonate, sodium-1-tert.butylnaphthalene-2-sulphonate, sodium-1,5-dibutyl-naphthalene-2-sulphonate, ammonium-1-benzylnaphthalene-2-sulphonate, potassium-1-diphenyl-naphthalene-methane-3-sulphonate, sodium-benzyl-isopropyl-naphthalene-sulphonates, or the condensation products of said naphthalene monosulphonic acids with formaldehyde or with compounds giving off formaldehyde, such as trioxymethylene, e.g. di-alkyl- or di-aralkyl-naphthalenemethanedisulphonates, such as the disodium salt of di-(1-tert.butyl-2-sulphonaphthyl-2)-methane, the dipotassium salt of di-(1-benzyl-2-sulphonaphthyl-2-)-methane or the diammonium salt of di-(1-diphenylmethylene-3-sulphonaphthyl)-methane;

(8) sulphonates of polycarboxylic acid esters, e.g. sodium-dioctylsulphosuccinate, sodium-dihexylsulphophthalate;

(9) sulphates of N-acylated alkanolamines, e.g. the sulphated amides of caprylic, pelargonic, capric, lauric, myristic or stearic acid, or of lower fatty acids substituted by alkylphenoxy groups, such as octyl- or nonylphenoxyacetic acid, with mono- or bis-hydroxyalkylamines such as β-hydroxyethylamine, γ-hydroxypropylamine, β,γ-dihydroxypropylamine, bis-(β-hydroxyethyl)-amine, or with N-alkyl-N-hydroxyalkylamines such as N-methyl- or N-ethyl-N-(β-hydroxyethyl)-amine.

The anionic, surface-active agents are normally present in the form of their alkali metal salts, their ammonium salts, their water-soluble alkyl and hydroxyalkyl ammonium salts, such as lithium, potassium, sodium, ammonium, β-hydroxyethyl or bis-(β-hydroxyethyl)-ammonium salts.

The following, for example, may be mentioned as nonionic surface-active agents usable according to the invention;

(10) addition products of 10, preferably 15 to 50 mols of alkylene oxides, particularly of ethylene oxide, wherein individual ethyleneoxy units can be replaced by substituted epoxides such as styrene oxide and/or propylene oxide, with higher fatty acids, or with saturated or unsaturated alcohols, mercaptans or amines having 8 to 20 carbon atoms, or with alkylphenols or alkylthiophenols of which the alkyl radicals contain at least 7 carbon atoms;

(11) esters of polyalcohols, especially mono- or diglycerides of fatty acids having 12 to 18 carbon atoms, e.g. monoglycerides of lauric, stearic, palmitic or oleic acid, as well as the fatty acid esters of sugar alcohols such as sorbitol, sorbitans and saccharose, e.g. sorbitan-monolaurate (Span 20), -palmitate (Span 40), -stearate (Span 60), -oleate (Span 80), -sequioleate, -trioleate (Span 85) or their oxethylation products (Tween);

(12) the reaction products from higher-molecular fatty acids having preferably 8 to 20 carbon atoms and hydroxyalkylamines, as well as their ethylene oxide addition products. These can be produced, for example, from higher-molecular fatty acids, e.g. caprylic acid, stearic acid, oleic acid, and especially the acid mixture embraced by the collective term "coconut oil fatty acid", and hydroxyalkylamines such as triethanolamine, or preferably diethanolamine, as well as mixtures of these amines, with the reaction being so performed that the molecular ratio between hydroxyalkylamine and fatty acid is greater than 1, e.g. 2:1. Such compounds are described in the U.S. Pat. No. 2,089,212.

Good results are likewise obtained if amides are used which are derived from the mentioned higher-molecular fatty acids, or from dodecyloxyacetic acid, lauryloxyacetic acid and alkylphenoxyacetic acids, of which the alkyl radicals contain 8 to 12, preferably 9, carbon atoms; and from the following hydroxyalkylamines, in the molecular ratio of 1:1, from mono-(hydroxyalkyl)-amines, e.g. ($\beta$-hydroxyethyl)-amine, ($\gamma$-hydroxypropyl)-amine or ($\beta$-$\gamma$-dihydroxypropyl)-amine, from bis-(hydroxyalkyl)-amines such as bis-($\beta$-hydroxyethyl)-amine or bis-($\alpha$-methyl-$\beta$-hydroxyethyl)-amine, or from N-alkyl-N-(hydroxyalkyl)-amines such as N-methyl- or N-ethyl-N-($\beta$-hydroxyethyl)-amine, or N-methyl- or N-ethyl-N-($\gamma$-hydroxypropyl)-amine. Bis-($\omega$-hydroxyalkyl)-amides are preferred, particularly those of which the hydroxyalkyl radicals contain 2 or 3 carbon atoms, such as, e.g. bis-($\beta$-hydroxyethyl)-amides, or bis-($\gamma$-hydroxypropyl)-amides of coconut oil fatty acids.

Suitable non-ionic, surface-active agents are moreover alkylene oxide condensation products, especially ethylene oxide condensation products, whereby individual ethyleneoxy units can be replaced by substituted epoxides, such as styrene oxide and/or propylene oxide, of the above mentioned alkanolamides.

As cationic, surface-active agents usable according to the invention mention is made of, e.g. dodecylammoniumacetat and, in particular, quaternised surface-active agents, such as, e.g. cetylpyridinium acetate, or quaternised alkylammonium polyglycol ethers, such as are described in the Swiss Pat. No. 409,941.

The choice of surface-active agents to be used is governed by the character of the dyestuff or dyestuffs employed; i.e., with the use of anionic dyestuffs, suitable surface-active agents are preferably anionic, non-ionic or ampholytic tensides; and with the use of cationic dyestuffs advantageously cationic, non-ionic and ampholytic tensides.

Those preferred are anionic and non-ionic tensides, particularly sulphonates of polycarboxylic acid esters such as sodium-dioctylsulphosuccinate, alkylarylsulphonates such as sodium-dibutylnaphthalenesulphonates, sulphated addition products of 1 to 5 mols of ethylene oxide with alkyl phenols, such as the acid sulphuric acid ester of the addition product of 2 mols of ethylene oxide with p-nonyl phenol, or addition products of 15 to 50 mols of ethylene oxide with alkylphenols of which the alkyl radical contains at least 7 carbon atoms, such as nonylphenol octadecaglycol ether, or the reaction products of fatty acids having 8 to 20 carbon atoms and hydroxyalkylamines, such as the reaction products of coconut oil fatty acid and diethanolamine (known as Kritchevsky bases).

It is particularly favourable if mixtures are used consisting of one of the mentioned non-ionic, surface-active agents, especially fatty acid alkanolamindes, with said anionic surface-active agents, particularly sulphated fatty alcohol polyglycol ethers having 2 to 10 ether groups, such as, e.g. the ammonium salt of sulphated lauryl alcohol triglycol ether, or particularly a mixture of fatty acid alkanolamides with sulphated fatty alcohol polyglycol ethers, such as the mixture of coconut fatty acid-N-bis-($\beta$-hydroxyethyl)-amide and the sodium salt of sulphated lauryl alcohol triglycol ether.

If necessary, the dye liquor can contain further constituents, such as acids, especially an organic lower aliphatic monocarboxylic acid, e.g. formic or acetic acid, sodium hydroxide, salts such as ammonium sulphate, sodium sulphate, sodium carbonate or sodium acetate, and/or carriers, e.g. based on o-phenyl phenol, trichlorobenzene or diphenyl.

In the preparation of the dye liquors, it is advantageous to commence with aqueous dyestuff solutions or dyestuff dispersions and to add to these the appropriate surface-active agent.

The process according to the invention is preferably performed in closed, optionally pressure-tight containers, e.g. in circulation equipment such as chaece dyeing machines or beam dyeing machines, jet machines, winch-dyeing machines, drum dyeing machines, open vats, or in paddle- or jig-dyeing machines. The process can be carried out, for example, as follows: The dye liquor and the material to be dyed are transferred, with a goods-to-liquor ratio of 1:1.5 to 1:4, preferably 1:1.5 to 1:2.5, or the material impregnated with the given goods to liquor ratio or advantageously sprayed, at a temperature below the absorption temperature of the dyestuffs, advantageously at 20° to 40° C., to the container; the dye liquor is then evenly distributed on the fibre material, below the absorption temperature of the dyestuffs, optionally by mechanical movement; and the temperature of the dye bath subsequently raised, by the introduction of saturated steam, superheated steam or hot air, advantageously however by heating from without, within 15 to 30 minutes to 95° to 140° C., advantageously to 98° to 105° C.; and this temperature maintained for ca. 15 to 120 minutes, advantageously for 20 to 45 minutes, until the dye liquor is exhausted. The dye bath is then cooled and the dyed material removed from the bath; the bulk of surplus dye liquor is separated from the material by squeezing, and the dyed fibre material, optionally after rinsing with warm water, dried. By virtue of the high degree of bath exhaustion and the small amounts of surface-active agents, a subsequent cleansing of the dyed material is in most cases unnecessary.

Compared with known processes, the process according to the invention has noticeable advantages. The main advantages are that the dyestuffs are practically completely absorbed, that only small till no migration of the dyestuffs occurs, and that, within shorter dyeing times than usual, deeply coloured, even and non-streaky dyeings well dyed throughout are obtained. According to the present invention, deeply coloured dyeings are obtained with extremely small amounts of water, and hence with practically no accumulation of contaminated water, and without dyeing being performed in the presence of a stable microfoam, the obtained dyeings being to a great extent free from sandwich effect.

The following examples serve to illustrate the invention. Temperatures are expressed in degrees Centigrade.

EXAMPLE 1

An amount of 0.66 g of the dyestuff of the formula

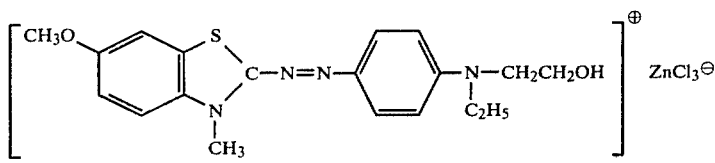

is dissolved in 90 ml of hot water. An addition is then made to the obtained solution of 0.5 g of a mixture consisting of 9 parts of the sodium salt of sulphated lauryl alcohol triglycol ether, 9 parts of coconut oil fatty acid-N-bis-(β-hydroxyethyl)-amide and 2 parts of isopropanol and 0.2 ml of acetic acid (80%); the solution is thereupon made up to 100 ml by the addition of water. After cooling to room temperature, the dyestuff solution and 66.6 g of a polyacrylonitrile staple fabric (ORLON) in the rolled up state are placed into a metal container such as is employed for the dye baths of the equipment of the firm Callebaut de Blicquy, Brussels; the container is then closed and well shaken. It is subsequently kept in continuous motion in the dyeing apparatus in the usual manner; the bath temperature is raised within 15 minutes from 20° to 100° and this temperature maintained for 30 minutes. After cooling, the dyed fabric is removed and squeezed out to leave as little moisture as possible in the material; it is afterwards rinsed by heating in water for 5 minutes in the above described container with a goods to liquor ratio of 1:2, and finally dried.

An even blue dyeing is obtained which is excellently dyed throughout and which has very good fastness to wet processing and to light.

If instead of 0.5 g of the surface-active agent given in Example 1, 0.5 g of sodium dioctylsulphosuccinate is used, with the procedure otherwise as described in Example 1, then there is obtained on polyacrylonitrile staple fabric likewise a very even blue dyeing well dyed throughout and possessing good fastness to light and to wet processing.

EXAMPLE 2

If 0.66 g of the dyestuff of the formula

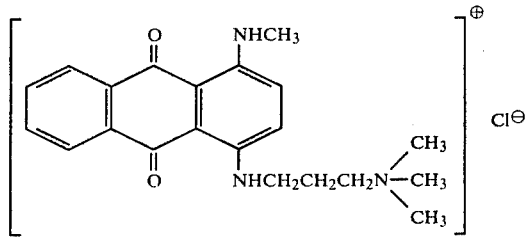

is used instead of the dyestuff given in Example 1, and 0.5 g of ammonium nonyl phenol diglycol ether sulphonate or 0.2 g of sodium dioctylsulphosuccinate instead of the surface-active agent given in Example 1, the procedure being otherwise as described in Example 1, then there is likewise obtained, on polyacrylonitrile staple fabric, a very even blue dyeing well dyed throughout and having fastness to light and to wet processing.

EXAMPLE 3

If 0.5 g of the dyestuff of the formula

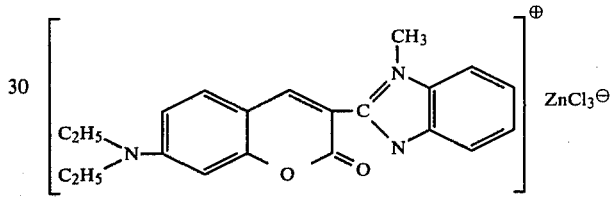

is used instead of the dyestuff given in Example 1, and 50 g, instead of 66.6 g, of a polyacrylontrile stable fabric (ORLON) treated, the procedure being otherwise as described in Example 1, then an even, deeply coloured, brilliant yellow dyeing is obtained which is well dyed throughout.

EXAMPLE 4

If 0.66 g of the dyestuff of the formula

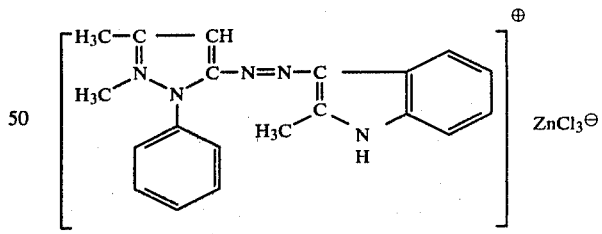

is used instead of the dyestuff given in Example 1, and instead of the surface-active agent used in Example 1. 1 g of the reaction product of coconut oil fatty acid and diethanolamine in the molecular ratio of 1:2 (Kritchevsky bases), or 0.4 g of sodium dioctylsulphosuccinate added, and instead of 66.6 g, 33.3 g of a polyacrylonitrile staple fabric (ORLON) treated, the procedure being otherwise as given in Example 1, then an even yellow dyeing is obtained well dyed throughout and having good fastness to wet processing and to light.

EXAMPLE 5

An amount of 0.9 g of the dyestuff of the formula

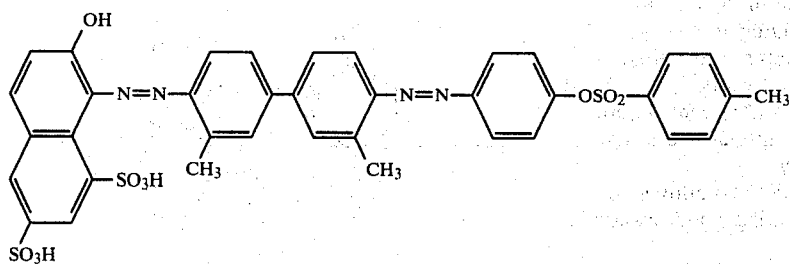

is dissolved in 90 ml of hot water; there is then added to this solution 0.2 g of a mixture consisting of 1 part of the sodium salt of sulphated lauryl alcohol triglycol ether and 1 part of coconut oil fatty acid-N-bis-(β-hydroxyethyl)-amide, and 0.2 ml of 80% acetic acid; the amount of liquid is afterwards made up to 100 ml by the addition of water. After cooling to room temperature the dyestuff solution together with 66 g of polyamide-6,6-tricot is placed into a metal container as described in Example 1. With the procedure otherwise as described in Example 1, an even, non-streaky, brilliant red dyeing is obtained well dyed throughout and possessing good fastness properties.

If, instead of the 0.2 g of the surface-active agent given in Example 5, 0.5 g of sodium dioctylsulphosuccinate is used, with the procedure otherwise as given in Example 5, than there is obtained on polyamide-6,6-tricot a likewise non-streaky, brilliant red dyeing, well dyed throughout and possessing good fastness properties.

EXAMPLE 6

If, instead of the 0.2 g of surface-active agent used in Example 5, 0.5 g of coconut oil fatty acid-N-bis-(β-hydroxyethyl)-amide is used, with the procedure otherwise as defined in Example 5, then there is obtained on polyamide-6,6-tricot likewise an even, non-streaky, brilliant red dyeing well dyed throughout and having good fastness properties.

If there is used in the above example, instead of 0.5 g of surface-active agent 0.05 g of a mixture consisting of 1 part of the sodium salt of sulphated lauryl alcohol triglycol ether and 1 part of coconut oil fatty acid-N-bis-(β-hydroxyethyl)-amide, the procedure adopted being otherwise as described in Example 5, then there is obtained on polyamide-6,6-tricot likewise an even, non-streaky, brilliant red dyeing well dyed throughout and possessing good fastness properties.

EXAMPLE 7

If, instead of the dyestuff given in Example 5, there is used 0.6 g of the dyestuff of the formula

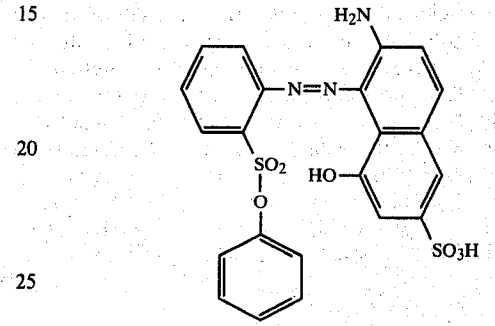

and instead of 0.5 g of the surface-active agent given in Example 1, 0.5 g of ammonium nonyl phenol diglycol ether sulphate, 0.5 g of sodium dibutylnaphthalene sulphonate, 0.3 g of sodium dioctylsulphosuccinate, 0.4 g of stearylpentacosaethylene glycol ether, 0.3 g of a condensation product of 30 mols of ethylene oxide and 1 mol of ricinoieic acid, 0.5 g of cetyl pyridinium acetate, 0.4 g of ammonium-1-butylnaphthalene-2-sulphonate or 0.5 g of the disodium salt of di-(1-diphenylmethylene-3-sulphonaphthyl)-methane, the procedure employed being otherwise as defined in Example 5, then there is obtained on polyamide-6,6-tricot an even, non-streaky, brilliant red dyeing well dyed throughout and having good fastness to wet processing and to light.

EXAMPLE 8

An amount of 100 g of the dyestuff of the formula

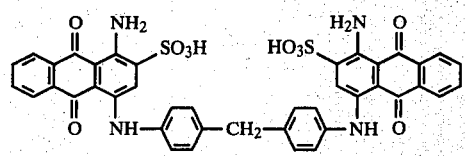

is dissolved in 10 liters of hot water; there is then added to the obtained solution 30 g of a mixture consisting of 1 part of the sodium salt of sulphated lauryl alcohol triglycol ether and 1 part of coconut fatty acid-N-bis-(β-hydroxyethyl)-amide, and 30 ml of 80% acetic acid, the dye liquor being then made up with water to 15 liters. A sample of 10 kg of polyamide-6,6-pullover material is placed into a drum dyeing apparatus having a design permitting dyeing to be performed with concentrated goods-to-liquor ratios; the textile material is then evenly sprayed with the above described dye liquor cooled to room temperature. The drum is rotated at room temperature until the dye liquor is uniformly distributed through the material to be dyed. Whilst rotation of the drum continues, the bath temperature is subsequently raised within 20 minutes from 20° to 100°, and held there for 20 minutes. After cooling, the water content of the dyed pullover material in the drum-dyeing apparatus is reduced by centrifuging to a value of ca. 50%. The dyed material is thereupon washed twice for 5 min. by spraying with 15 liters of water at 60°; the residual water content is again reduced by centrifuging to ca. 50%, and the material dried by means of an air stream at ca. 100° for ca. 15 minutes.

There are obtained blue polyamide-6.6-pullover materials well dyed throughout and having good fastness to wet-processing and to light.

If, instead of 30 g of the surface-active agent given in the above example, an amount of 30 g of nonylphenol-pentadecaethylene glycol ether, 30 g of highly sulphated ricinoleic acid, 25 g of the disodium salt of di-(1-tert. butyl-2-sulphonaphthyl)-methane, 15 g of the dipotassium salt of di-(1-benzyl-2-sulphonaphthyl)-methane, 30 g of the disodium salt of di-(1-diphenylmethylene-3-sulphonaphthyl)-methane or 20 g of the sodium salt of benzylisopropyl-naphthalene-sulphonate are used, the procedure being otherwise as described in Example 8, then there is obtained on polyamide-6.6-pullover likewise an even, nonstreaky, blue dyeing, well dyed throughout and possessing good fastness properties.

EXAMPLE 9

An amount of 1.3 g of the dyestuff of the formula

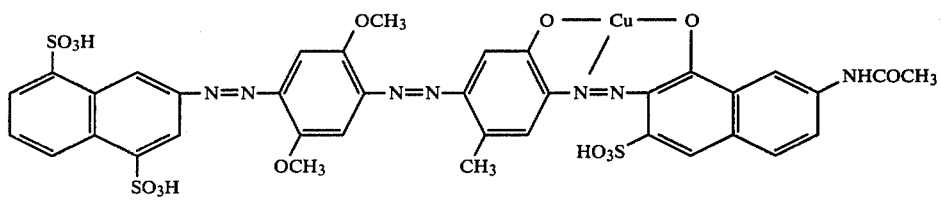

is dissolved in 90 ml of hot water; there is then added to the solution 0.5 g of a mixture consisting of 9 parts of the sodium salt of sulphated lauryl alcohol triglycol ether, 9 parts of coconut oil fatty acid-N-bis-(β-hydroxyethyl)-amide, and 2 parts of isopropanol, and 0.5 parts of sodium sulphate; the amount of liquor is made up to 100 ml by the addition of water. After cooling to room temperature, the dyestuff solution is transferred, together with 66.6 g of cotton fabric, to a metal container as described in Example 1. With the procedure otherwise as described in Example 1, there is obtained an evenly dyed, dark grey cotton fabric well dyed throughout and having good fastness to wet-processing and to light.

If, instead of 0.5 g of the surfactant given in Example 1, there is used an amount of 0.5 g of ammonium nonyl phenol diglycol ether sulphonate, 0.5 g of sodium dioctylsulphosuccinate or 0.4 g of sodium dibutyl-naphthalene sulphonate, the procedure being otherwise as described in the example, then there is likewise obtained an even darkgrey dyeing well dyed throughout.

EXAMPLE 10

If, instead of the dyestuff given in Example 1, there is used 1.5 g of the 1:2-chromium complex of the dyestuff of the formula

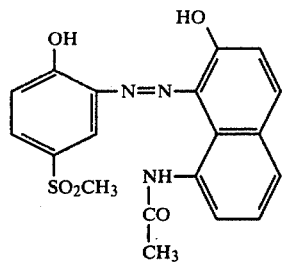

and instead of 66.6 g of polyacrylonitrile staple fabric, 66.6 g of wool flannel, the procedure being otherwise as described in Example 1, then there is obtained a dark grey even wool dyeing well dyed throughout and having good fastness to wet-processing and to light. The small amount of dye liquor remaining after dyeing is colourless.

If 0.5 g of ammonium nonyl phenol glycol ether sulphonate or 0.5 g of nonylphenol pentadecaglycol ether is used in the above example instead of 0.5 g of the surface-active agent used in Example 1, and the bath temperature maintained, instead of for 30 minutes, for only 15 minutes at 100°, the procedure being otherwise as described in Example 10, then there are obtained likewise even dark-grey wool dyeing well dyed throughout.

EXAMPLE 11

If, instead of the dyestuff given in Example 1, 0.6 g of the dyestuff of the formula

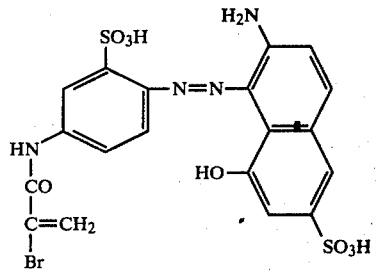

is used, and instead of 0.5 g of the surface-active agent used in Example 1, 1 g of the reaction product of coconut oil fatty acid and diethanolamine in the molecular ratio of 1:2 (Kritchevsky-bases), 0.6 g of sulphonated condensation product of 10 mole ethylene oxide and 1 mol of stearyl amine or 0.5 g of sodium dibutylnaphthalene sulphonate added, and instead of polyacrylonitrile staple fabric, 66 g of wool flannel treated, the procedure being otherwise as described in Example 1, then there is obtained a red wool dyeing well dyed throughout and having fastness to light and to wet-processing.

EXAMPLE 12

If, instead of the dyestuff given in Example 9, there is used 0.01 g of the optical brightener of the formula

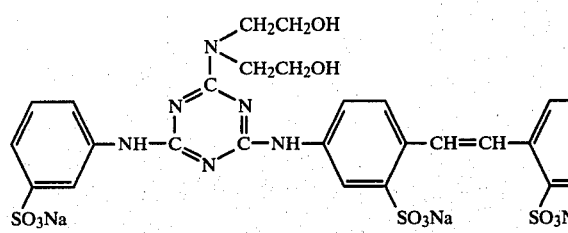

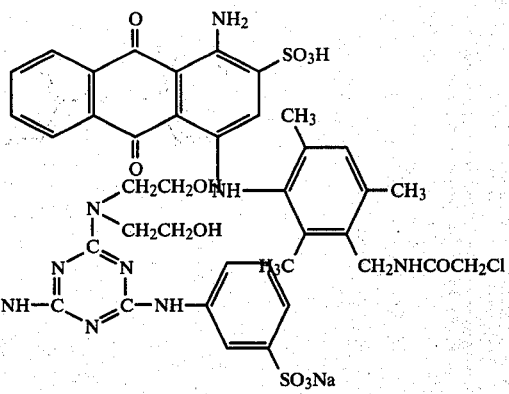

the procedure being otherwise as given in Example 9, then there is obtained an even, optically brightened cotton fabric.

EXAMPLE 13

An amount of 0.66 g of the dyestuff of the formula

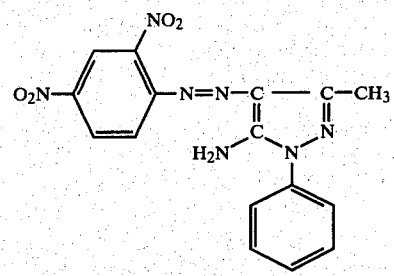

is dispersed in 50 ml of hot water; there is then made to the dispersion an addition of 0.5 g of a mixture consisting of 9 parts of the sodium salt of sulphated lauryl alcohol diglycol ether, 9 parts of coconut oil fatty acid-N-bis-($\beta$-hydroxyethyl)-amide and 2 parts of isopropanol, and 0.6 g of carrier consisting of 45 parts of o-phenylphenol, 41 parts of ethylene glycol, 2.5 parts of polyvinyl alcohol, 2.5 parts of dioctylsulphosuccinate and 9 parts of water, dissolved in 50 ml of hot water. After cooling to room temperature, the dyestuff suspension and 33 g of polyethylene glycol terephthalate fabric are placed into a metal container as described in Example 1. If the subsequent procedure is as described in Example 1, then there is obtained an even orange dyeing well dyed throughout which has the same fastness to wet-processing and to light as that possessed by a dyeing on polyethylene glycol terephthalate fabric obtained in the usual manner with a ratio of goods to liquor of 1:10.

If 0.5 g of ammonium nonyl phenol diglycol ether sulphonate or 0.5 g of sodium dioctylsulphosuccinate is used in Example 13 instead of 0.5 g of the surface-active agent given in Example 1, and 2 g of monochloro-phenoxyethanol instead of 0.6 g of the carrier given in the above example, the procedure being otherwise as described in Example 13, then there is obtained likewise an even orange dyeing well dyed throughout.

EXAMPLE 14

An amount of 0.66 g of the dyestuff mixture consisting of 10 parts of the dyestuff of the formula and 60 parts of the dyestuff of the formula

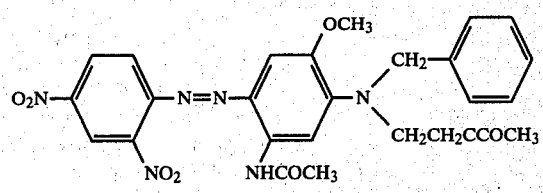

is dispersed in 90 ml of hot water; there is then added to the dispersion 0.5 g of a mixture consisting of 9 parts of the sodium salt of sulphated lauryl alcohol triglycol ether, 9 parts of coconut oil fatty acid-N-bis-($\beta$-hydroxyethyl)-amide and 2 parts of isopropanol, and 0.2 ml of acetic acid (80%); the dispersion is thereupon made up by the addition of water to 100 ml. After cooling to room temperature, the dyestuff dispersion is placed, together with 66.6 g of a mixed fabric in the rolled up condition, the said fabric consisting of 67% of polyethylene glycol terephthalate and 33% of wool, into a metal container; the container is then closed and well shaken. It is subsequently kept in continuous motion, in the usual manner, in the dyeing apparatus according to Example 1; the bath temperature is raised within 15 minutes from 20° to 130° and maintained there for 30 minutes. After cooling, the dyed mixed fabric is removed; it is squeezed out to obtain a moisture content of ca. 50%, subsequently rinsed with cold water, and then soaped with warm water containing 2 g/l of the addition product of 9 moles of ethylene oxide with 1 mole of nonyl phenol.

There is obtained an even navy blue dyeing well dyed throughout, with both fibre constituents being uniformly dyed.

EXAMPLE 15

An amount of 10 g of the dyestuff of the formula

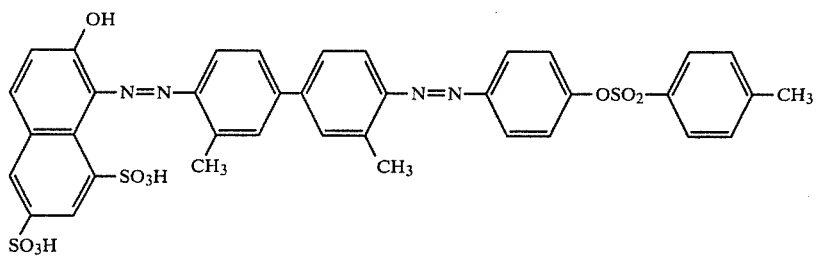

is dissolved in 1500 ml of hot water; addition are then made to the solution of 10 g of sodium salt of sulphated lauryl alcohol triglycol ether and 20 ml of acetic acid (80%), and the whole made up by the addition of water to 2000 ml. After cooling to room temperature, the dyestuff solution is sprayed in atomised form by means of a volumetric gear under pressure of 25 atmospheres to pullovers rotating continuously in a drum at room temperature with a rotary speed of 25 revolutions per minute, the said pullovers being made from polyamide-6.6 and having a total weight of 1000 g. After completion of the atomisation spraying process, the indirect heating is switched on, with the drum still rotating, and by addition of 1000 ml of water to the bottom of the drum and evaporation of the water, an immediate formation of saturated steam in the drum is obtained, whilst the temperature is allowed to rise to 98°. Within 10 minutes there is produced in this manner a saturated steam atmosphere of 98° and this then maintained for 20 minutes. The dyed material is subsequently cooled to a temperature of 70° and then centrifuged in the dyeing drum until a residual moisture content of about 50% on the fibre is obtained. An amount of 2000 ml of water is thereupon applied by atomisation to the rotating dyed textile material. After completion of this atomisation washing treatment, the dyed material is centrifuged and afterwards dried with hot air at about 100°.

An even, non-streaky, brilliant red dyeing is obtained on pullovers made from polyamide-6.6 well dyed throughout and possessing good fastness properties.

EXAMPLE 16

An amount of 1.3 g of the disodium salt of copper phthalocyanine disulphonic acid is dissolved in 90 ml of hot water; additions are then made to the solution of 0.5 g of coconut oil fatty acid-N,-N-bis-(β-hydroxyethyl)-amide and 0.8 g of sodium sulphate, and the liquor made up to 100 ml by the addition of water. After cooling to room temperature, the dyestuff solution is transferred together with 66.6 g of cotton fabric to a metal container such as is described in Example 1. With otherwise the procedure as given in Example 1, there is obtained an evenly dyed turquoise cotton fabric which is well dyed throughout and possesses good fastness to wet-processing and to light.

EXAMPLE 17

An amount of 1 g of the dyestuff mixture of the formula

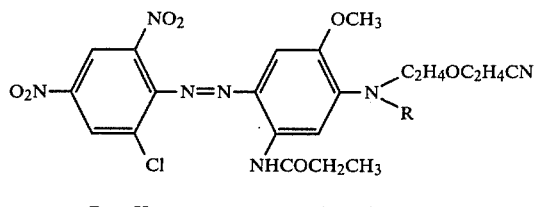

R = H  about 60%
R = C$_2$H$_4$OC$_2$H$_4$CN  about 40% is dispersed in 50 ml of hot water; additions are then made to the dispersion of 0.5 g of sodium dioctylsulphosuccinate, and 2 g of carrier consisting of 60 parts of dichlorophenoxypropanol and 40 parts of casein, dissolved in 50 ml of hot water. After cooling to room temperature, the dyestuff suspension is transferred, together with 33 g of cellulose triacetate fabric, to a metal container such as is described in Example 1. If the procedure given in Example 1 is then carried out, an even navy blue dyeing well dyed throughout is obtained, which possesses the same fastness to wet processing and to light as a corresponding dyeing on cellulose triacetate fabric obtained in the usual manner with a goods-to-liquor ratio of 1:10.

We claim:

1. A batch process for the exhaustion dyeing of fiber material, comprising the steps of first applying to the fiber material an aqueous non-foaming dye liquor, containing no thickening agent and containing
   (a) a water-soluble or water-dispersible dyestuff having affinity for the fiber material and
   (b) a non-foaming amount, in the range of 0.2 to 10 grams per liter, of a surface-active agent which has no cloud point and which is selected from the group consisting of $C_{10}$ to $C_{20}$-fatty acid soaps, sulfated $C_8$ to $C_{18}$-alkanol soaps, sulfated unsaturated higher fatty acid ester soaps, soaps of sulfated ethyleneoxide-$C_8$ to $C_{20}$-alkanol adducts, soaps of sulfated esterified polyoxy compounds, soaps of $C_8$ to $C_{20}$-primary and secondary alkyl sulfonates, soaps of alkylarylsulfonates having at least 7 carbon atoms in the alkyl chain, soaps of sulfonates of polycarboxylic acid esters, soaps of sulfates of N-acylated alkanolamines, ethyleneoxide-higher fatty acid adducts, ethyleneoxide-$C_8$ to $C_{20}$-alkanols, ethyleneoxide-$C_8$ to $C_{20}$-mercaptan adducts, ethyleneoxide-$C_8$ to $C_{20}$-amine adducts, ethyleneoxide-alkylphenol adducts wherein the alkyl radical contains at least 7 carbon atoms, ethyleneoxide-alkylthiophenol adducts wherein the alkyl radical contains at least 7 carbon atoms, fatty acid mono- or di-glycerides, higher molecular fatty acid amides, and adducts of higher molecular fatty acid-hydroxyalkyl amides with ethyleneoxide,
at a goods-to-liquor ratio of 1:1.5 to 1:2.5 and at a temperature below the absorption temperature of the dyestuff, subsequently shaking or tossing the fiber material and applied aqueous dye liquor, in a closed container, sufficiently to evently distribute the aqueous dye liquor on the fiber material, while still maintaining the temperature below the absorption temperature of the dyestuff, and finally heating the fiber material and the evenly-distributed aqueous dye liquor at a temperature in the range of 95° to 140° C. to exhaust the dyestuff onto the fiber material.

2. The process of claim 1, wherein the surface-active agent is selected from the group consisting of sulphonates of polycarboxylic acid esters, dialkyl- or diaralkyl-naphthylmethane disulphonates, alkylarylsulphonates, reaction product of fatty acids having 8 to 20 carbon atoms and hydroxyalkylamides, addition products of 15 to 50 mols of ethyleneoxide with alkylphenols having an alkyl radical with at least 7 carbon atoms, sulphated addition products of 1 to 5 mols of ethyleneoxide with alkyl phenols of which the alkyl radical contains at least 7 carbon atoms, and a mixture of fatty acid alkanolamides with sulphated fatty alcohol polyglycol ethers.

3. The process of claim 1, wherein the aqueous dye liquor and fiber material is heated in the final step at a temperature in the range of 98° to 105° C.

4. The process of claim 1, wherein the heating is effected by the introduction of saturated steam, superheated steam, or hot air.

5. The process of claim 1, wherein the fiber material and applied aqueous dye liquor are shaken to evenly distribute the aqueous dye liquor on the fiber material.

* * * * *